United States Patent
Bhalotra et al.

(10) Patent No.: US 10,397,255 B1
(45) Date of Patent: Aug. 27, 2019

(54) SYSTEM AND METHOD FOR PROVIDING SECURITY IN A DISTRIBUTED COMPUTATION SYSTEM UTILIZING CONTAINERS

(71) Applicant: StackRox, Inc., Mountain View, CA (US)

(72) Inventors: Sameer Bhalotra, Pleasanton, CA (US); Ali Golshan, Los Altos, CA (US); Dhananjay Sampath, Sunnyvale, CA (US); Vishwanath Raman, Palo Alto, CA (US)

(73) Assignee: StackRox, Inc., Mountain View, CA (US)

( * ) Notice: Subject to any disclaimer, the term of this patent is extended or adjusted under 35 U.S.C. 154(b) by 243 days.

(21) Appl. No.: 15/273,482

(22) Filed: Sep. 22, 2016

Related U.S. Application Data

(60) Provisional application No. 62/222,628, filed on Sep. 23, 2015.

(51) Int. Cl.
*G06F 21/00* (2013.01)
*H04L 29/06* (2006.01)

(52) U.S. Cl.
CPC ...... *H04L 63/1425* (2013.01); *H04L 63/1433* (2013.01)

(58) Field of Classification Search
CPC .............. H04L 63/1425; H04L 63/1433
See application file for complete search history.

(56) References Cited

U.S. PATENT DOCUMENTS

| | | | | |
|---|---|---|---|---|
| 9,317,304 B2* | 4/2016 | Collado | ............... | G06F 9/5027 |
| 9,524,214 B1* | 12/2016 | Isdal | ................ | G06F 11/1438 |
| 2010/0023810 A1* | 1/2010 | Stolfo | ................ | G06F 11/3652 |
| | | | | 714/38.11 |
| 2010/0107180 A1* | 4/2010 | Ulrich | ................ | G06F 11/261 |
| | | | | 719/318 |
| 2010/0122343 A1* | 5/2010 | Ghosh | ................ | G06F 21/55 |
| | | | | 726/23 |
| 2012/0210333 A1* | 8/2012 | Potter | ................ | G06F 9/4843 |
| | | | | 719/313 |
| 2013/0097659 A1* | 4/2013 | Das | ................ | G06F 21/629 |
| | | | | 726/1 |
| 2014/0289807 A1* | 9/2014 | Collado | ................ | G06F 21/44 |
| | | | | 726/4 |
| 2016/0099963 A1* | 4/2016 | Mahaffey | ............ | H04L 63/0227 |
| | | | | 726/25 |
| 2017/0180399 A1* | 6/2017 | Sukhomlinov | ........ | G06F 21/552 |
| 2017/0353496 A1* | 12/2017 | Pai | ................ | G06F 21/53 |
| 2018/0157524 A1* | 6/2018 | Saxena | ............ | H04L 63/0236 |

\* cited by examiner

*Primary Examiner* — Kendall Dolly
(74) *Attorney, Agent, or Firm* — Cooley LLP

(57) ABSTRACT

A server has a processor and a memory connected to the processor. The memory stores instructions executed by the processor to collect operating signals from machines, where each operating signal characterizes the state or a change in operational state of a designated application operating within a designated container, where the designated container is an isolated process in user space designated by an operating system kernel. The operating signals are compared to models that incorporate summarizations of data sets that represent observed benign operating signals and malicious operating signals for the designated application operating within the designated container. Risks associated with the operating signals are characterized.

29 Claims, 5 Drawing Sheets

SYSTEM AND METHOD FOR PROVIDING SECURITY IN A DISTRIBUTED COMPUTATION SYSTEM UTILIZING CONTAINERS

CROSS-REFERENCE TO RELATED APPLICATION

This application claims priority to U.S. Provisional Patent Application Ser. No. 62/222,628, filed Sep. 23, 2015, the contents of which are incorporated herein by reference.

FIELD OF THE INVENTION

This invention relates generally to computer and application security. More particularly, this invention relates to techniques for providing security in a distributed computation system utilizing application containers.

BACKGROUND OF THE INVENTION

Modem software applications are designed to be modular, distributed, and interconnected. Some advanced software systems go a step further and divide complex applications into micro-services. Micro-services refer to software architectures in which complex applications are composed of many small, independent processes communicating with one another. Micro-services enable unprecedented efficiency and flexibility. However, micro-services architectures create a host of new security challenges, and so a new security solution is required. The ideal solution will leverage the advantages of the micro-services approach and properly protect both micro-services and traditional systems. As used herein, the term application includes a traditional monolithic code stack forming an application and a micro-services instantiation of an application.

Application containers provide compute capabilities that dramatically improve scalability, efficiency, and resource usage. Application containers are sometimes called containers, software containers, virtualization engines or operating-system level virtualization. Any such container packages an application and all of its dependencies as an isolated process in the user space of an operating system. An operating system kernel uses technologies, such as name spaces and cgroups, to enforce isolation between containers.

Containers can be run in on-premises data centers, private cloud computing environments, public cloud computing environments and on both bare metal servers and virtual machines. Containers are designed to be portable across different computing infrastructure environments, isolate applications from one another and enable improved resource utilization and management.

Containers are one of the main building blocks in micro-services systems, and are particularly easy to migrate across networks. Unfortunately, securing containers themselves, the applications that run within them, and the software infrastructure surrounding the containers, is a new challenge that has not yet been met. Accordingly, a new security solution is needed, ideally delivered within containers for efficiency and portability, while protecting the software infrastructure and containers that are used to run applications.

SUMMARY OF THE INVENTION

A server has a processor and a memory connected to the processor. The memory stores instructions executed by the processor to collect operating signals from machines, where each operating signal characterizes the state or a change in operational state of a designated application operating within a designated container, where the designated container is an isolated process in user space designated by an operating system kernel. The operating signals are compared to models that incorporate summarizations of data sets that represent observed benign operating signals and malicious operating signals for the designated application operating within the designated container. Risks associated with the operating signals are characterized.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
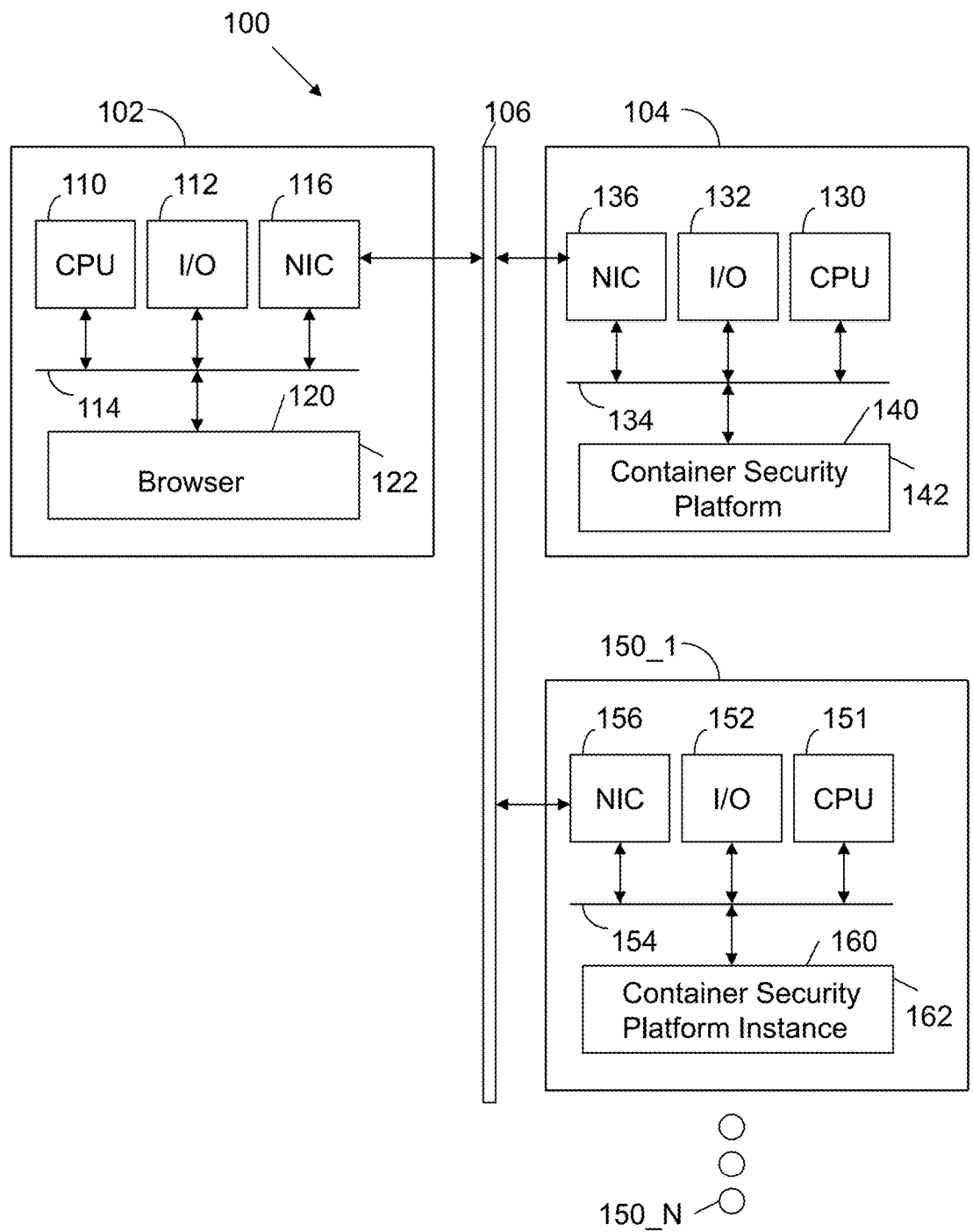
FIG. 1 illustrates a system configured in accordance with an embodiment of the invention.

FIG. 1 illustrates a system 100 configured in accordance with an embodiment of the invention. The system 100 includes a client machine 102 and at least one server 104 connected via a network 106, which may be any combination of wired and wireless networks. The client machine 102 includes standard components, such as a central processing unit 110 and input/output devices 112 connected via a bus 114. The input/output devices 112 may include a keyboard, mouse, touch display and the like. A network interface circuit 116 is also connected to the bus to provide connectivity to network 106. A memory 120 is also connected to the bus. The memory 120 may store a browser 122, which may be used to access server 104. As discussed below, the client machine 102 may access server 104 to obtain security alerts, security reports, security visualizations and security analytics. The client device 102 may be a personal computer, tablet, smartphone, wearable device and the like.

Server 104 also includes standard components, such as a central processing unit 130, input/output devices 104, bus 134 and network interface circuit 136 to provide connectivity to network 106. A memory 140 is connected to the bus 140. The memory stores instructions executed by the central processing unit 130 to implement operations disclosed herein. In particular, the memory 140 stores a container security platform (CSP) 142 to implement operations disclosed herein. The container security platform 142 is operative with container security platform instances 162 distributed across a set of machines 150_1 through 150_N. The term container security platform instance is used to denote that any such instance may be a full container security platform or a sub-set of the functionality associated with a full container security platform. Any of machines 104 and 150_1 through 150N may be either a physical or virtual machine. The container security platform 140 and container security platform instances run alongside applications executed within containers.

Figure 2:
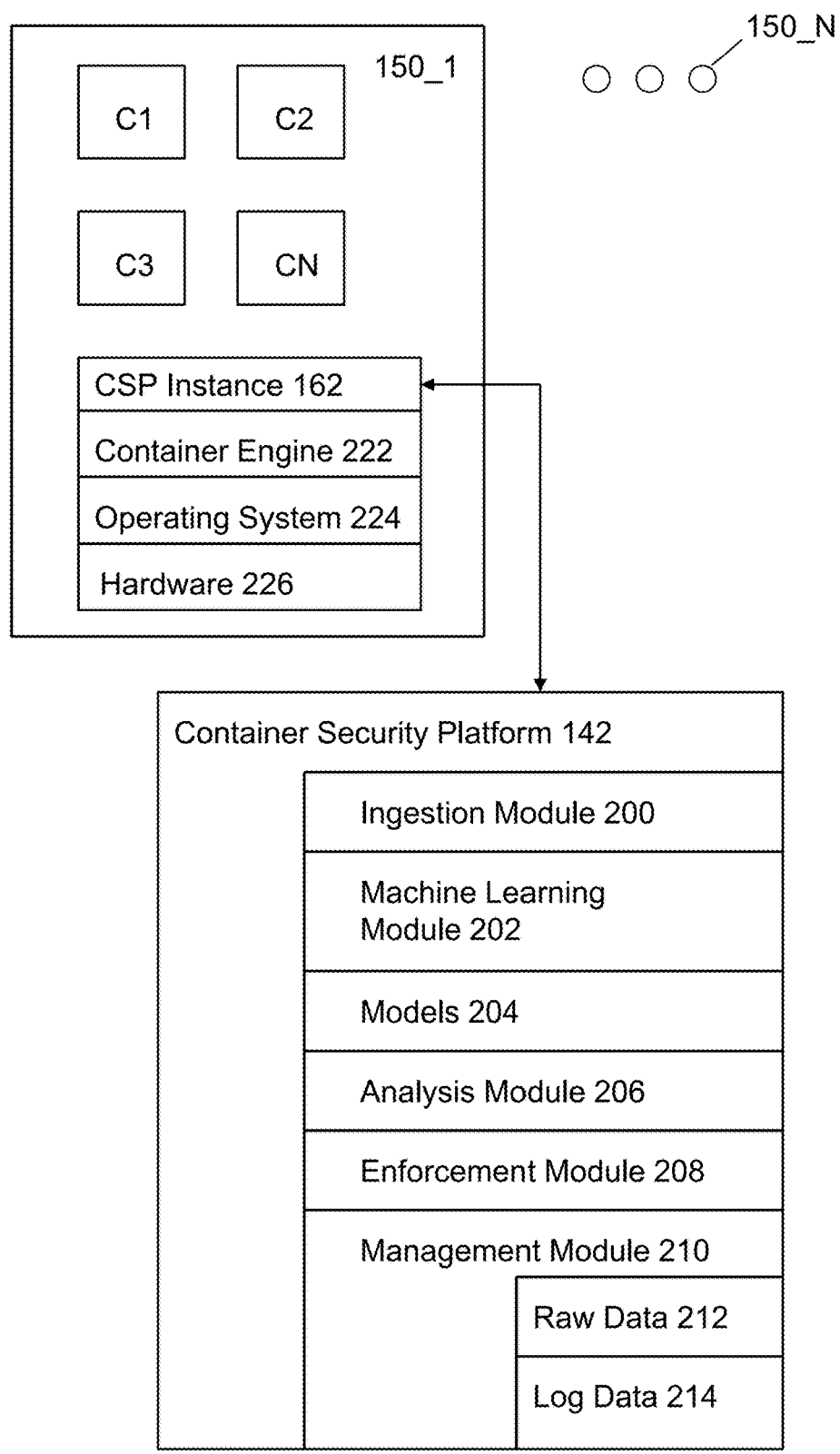
FIG. 2 is a more detailed characterization of certain components of FIG. 1.

Machine 150_1 also includes standard components, such as a central processing unit 151, input/output devices 152, bus 154 and network interface circuit 156. A memory 160 is connected to the bus 154. The memory 160 stores a container security platform instance 162, which includes instructions executed by the central processing unit 151 to implement operations disclosed herein. FIG. 2 more fully characterizes certain components of FIG. 1. The figure illustrates machines 150_1 through 150_N. Machine 150_1 includes the container security platform instance 162, which operates in communication with a container engine 222, also commonly referred to as a container runtime. For example, the container engine 222 may be Docker®. Docker® is an open source project that automates the deployment of Linux applications inside software containers. The container engine 222 forms different containers C1, C2, C3, and CN on machine 150_1. Each container may execute a different application (including micro-services). Each container may also execute the same application for scalability, redundancy, availability or other reasons. Alternately, each container may execute the same application, but for different tenants in a multi-tenant environment. The container engine 222 is operative on top of operating system 224, which may be a host operating system, which executes on hardware 226 (e.g., CPU 130, memory 140, etc.), or a guest operating system, which executes on a hypervisor. The CSP instance 162 interacts with both the container engine 222 and operating system 224 and continuously or periodically sends and receives data to and from the container security platform 142, as discussed in detail below.

The container security platform 142 may include a number of modules. Each module may be implemented as a container or collection of containers. Thus, a set of containers that comprise the CSP is operative to analyze activity in other containers. An ingestion module 200 consumes and processes operating signals and sends them to the machine learning module 202.

A machine learning module 202 generates data set representations of operating signals and uses various models in supervised, unsupervised, and semi-supervised learning modes to determine benign, anomalous, and malicious activity as evidenced by benign, anomalous, and malicious operating signals. The machine learning module 202 forms security models 204. The ingestion module 200 and machine learning module 202 receive data during a training phase, but may also be used in an operating phase to continuously learn and adapt to system conditions.

The machine learning module 202 is also used during an operating phase to compare data set representations of incoming operating signals to models 204. Based upon the comparison, the incoming operating signals are characterized as benign, anomalous or malicious. If an incoming operating signal is determined to be anomalous, the machine learning module 202 will further characterize the likelihood and risk that it is indicative of an application transitioning from a benign state to a malicious state.

An enforcement module 208 may be invoked to take preventive or responsive security measures against malicious activity. The enforcement module 208 performs a security measure or action, such as block, prevent, permit, log or report on the container engine, operating system kernel or other component of the system based on specified policies.

A management module 210 is configured to coordinate operations for all other modules of the platform and exposes an application programming interface (API) that is utilized by various clients, such as web applications and command line interfaces. The management module 210 may also manage raw data 212 and log data 214 and makes it available for processing by other modules or external systems. In one embodiment, the management module 210 handles launch, provisioning, management, monitoring, communication, security scanning and policy computation across other modules.

The analysis module 206 evaluates multiple data sets of different operating signals, anomalous and malicious security events, security alerts and notifications, and security policies to determine relationships. This results in security analytics, security visualization and the like, as discussed below. The analysis module 206 may operate on either raw data 212 or logged data 214. The analysis module 206 may also generate recommended protective security enforcement measures or recommended security policies.

In one embodiment, the analysis module 206 performs correlation between disparate data sets that may include but are not limited to operating signals, security events, or security policies, each of which may be in either raw or summarized format, to determine relationships that can then be used to trigger an action by the platform. The analysis module 206 maintains mappings of container metadata to network source information, summarizes network requests and responses based on system calls, and generates information on container network activity including but not limited to the amount of data transmitted between containers and corresponding container and application fingerprints. The analysis module evaluates security events detected by the machine learning module 202 that have no predetermined relationships to infer relationships that may be indicative of malicious activity. These relationships can be used to recommend new security policies or security measures to administrators and end users of the platform that will be enforced by the platform. Several factors including but not limited to frequency of occurrence, time between occurrences, similarity of data structures, characterized severity or risk level, and data inputted by users of the platform, may be considered to identify such relationships. The analysis module also evaluates existing security policies or security measures used by the platform to formulate recommended new security policies or security measures based on similarities of the operating signals, security events, attributes of containers or applications, or other factors.

Figure 3:
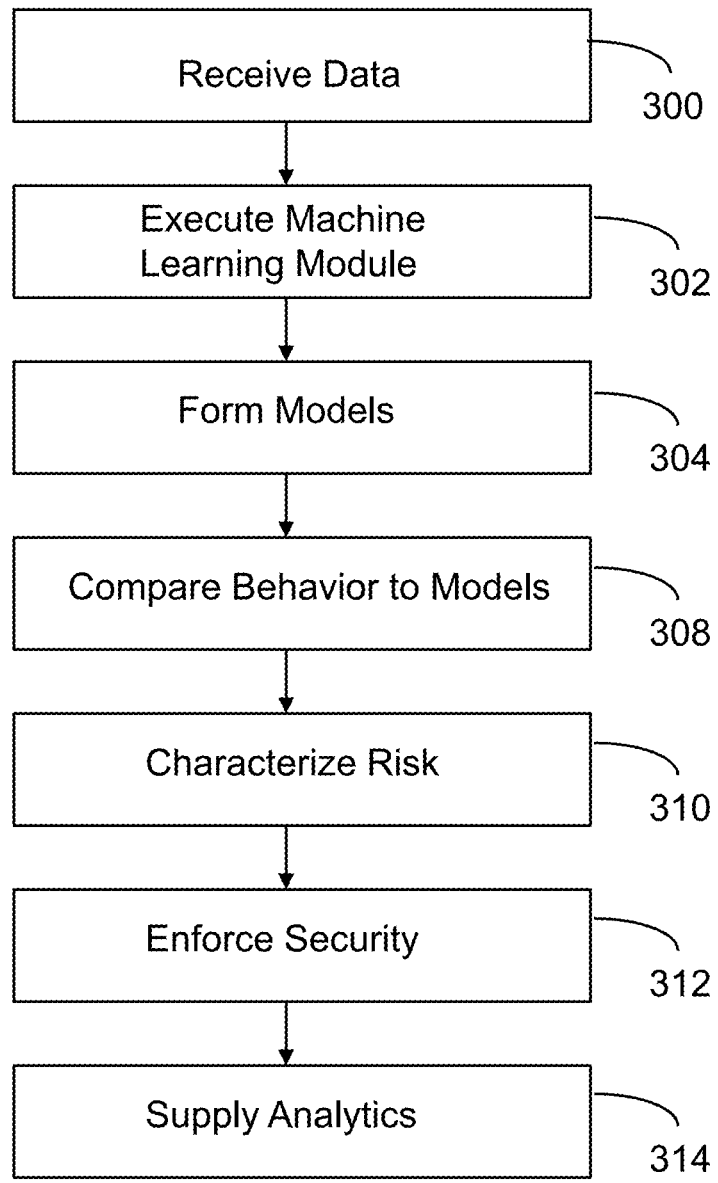
FIG. 3 illustrates processing operations performed in accordance with an embodiment of the invention.

FIG. 3 illustrates processing operations associated with an embodiment of the container security platform. The first three steps of FIG. 3 may be performed in a training phase and may continue to be performed during an operational phase. Initially, operating signal data is received 300. As used herein, the term operating signal means a signal that characterizes the state or a change in operational state of an application (including a micro-service) operating within a container. Thus, operating signals include: (1) any programmatic input, output, call, or other change made to a system; (2) any unit of data generated by a programmatic input, output, call, or other change made to a system; (3) metrics generated by a programmatic input, output, call or other change made to a system; or (4) attributes of the system that may be static or dynamic; that correspond to a change in the operational state of a process running in user space. An operating signal represents either the state of a system or change in the state of a system, where the system may include any combination of one or more of the following: an operating system kernel, memory, network device, storage device, containers, and applications. A representative list of operating signals includes but is not limited to: system calls, function calls, network input and output, network packets, memory pages, memory page forms, memory page tables, storage input and output, data on storage volumes, processor utilization, memory utilization, network utilization, storage disk utilization, container engine commands, container engine events, orchestrator events, application logs, raw or log data of any of the foregoing, or a data summarization of any of the foregoing.

The received data may be part of a training phase or operational phase. This may be implemented with the ingestion module 200. Training data may be in the form of known malicious exploits and known benign activity.

The machine learning module is then executed on the data 302. The machine learning module may operate in either an unsupervised learning mode, supervised learning mode, or a semi-supervised learning mode. The processing results in summarizations of data sets that represent observed benign operating signals and observed malicious operating signals to form models 304. Models are abstractions that represent different numeric and non-numeric characteristics of a signal as a collection or a singleton. Models incorporate summarizations of data sets that represent observed benign operating signals and malicious operating signals and compare data sets that represent new operating signals to these summarizations to determine whether these new operating signals are benign, anomalous, or malicious.

Operating signals are compared to models 308. For example, the ingestion module 160 may send operating signals continuously or for a time period to the container security platform 142. An embodiment of the invention uses a container running in privileged mode that initializes a kernel module to obtain operating signals. This kernel module should be capable of high performance and fidelity to ensure operating signal data is not lost. The collected signals may include system calls, function calls, network input and output, file reads and file writes, and data in memory. Another container may be used to obtain container engine commands and events and other operating signals. For each session, the collected signal specifies a data source and a container identification. The signals may be stored as raw data 212.

The ingestion and machine learning modules may process and analyze the signals to obtain insight into application and compute workloads, compute time, memory utilization, network activity, user access and other information technology system characteristics. The platform 142 can combine this visibility technology with container and application fingerprinting (discussed below) to create adaptive topological mappings between data, workloads and services.

The application behavior evidenced in the data set representations of the operating signals that correspond to a designated application is compared to one or more models. This results in the characterization of the risk of the application behavior 310.

In addition to risk characterization, the platform 142 may also evaluate system integrity. Application containers may operate at the root level within the container namespace. To ensure application integrity, the platform 142 analyzes container operations for signs of compromise, tampering, corruption or infection. The machine learning module 202 may analyze system data, determine how containers are interacting with the underlying software and hardware and calculate a level of confidence in each application's integrity. Confidence scores can be adjusted continuously as the platform 142 analyzes containers' runtime processes. The machine learning module 202 may also calculate a level of uniqueness for a particular occurrence.

Based upon the risk characterization, a security measure is optionally enforced 312. System or security activity analytics, metrics, reports or statistics may also be supplied 314. This information may be supplied in response to ad hoc queries or on a continuous reporting basis.

Figure 4:
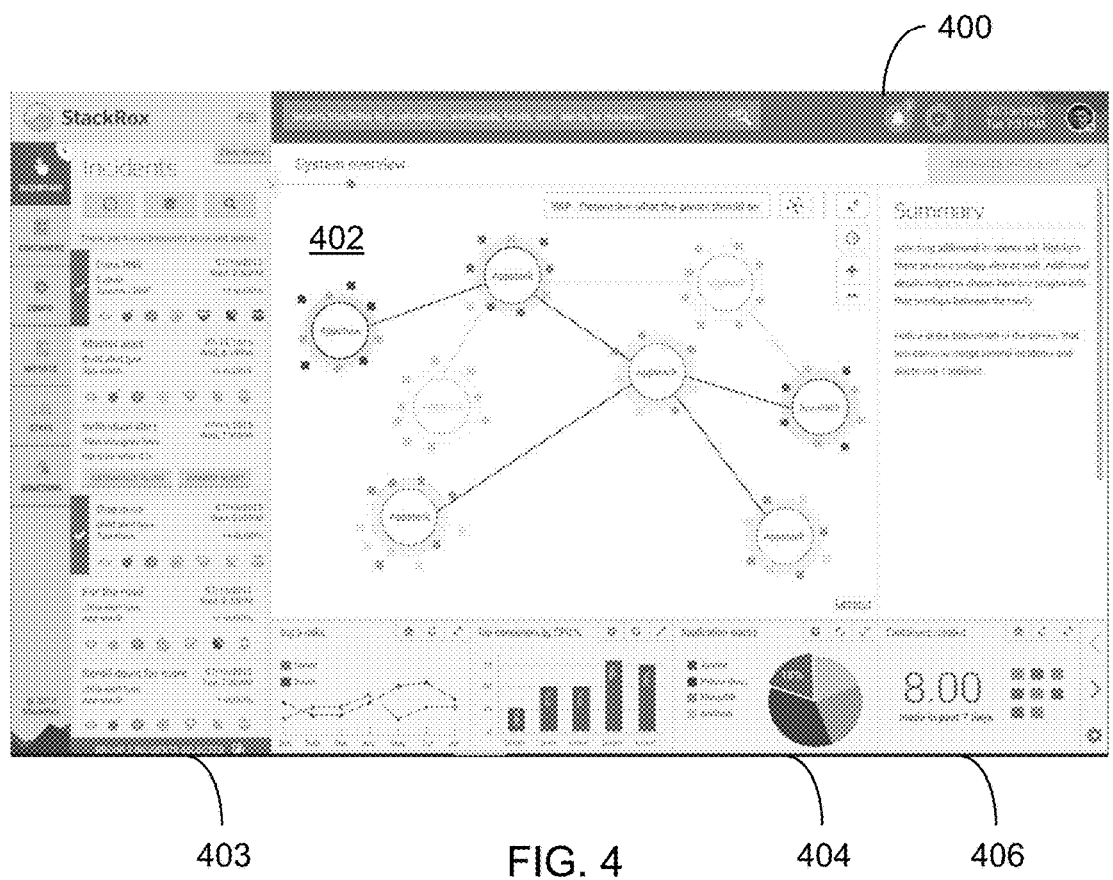
FIG. 4 illustrates an interface that supplies security information in accordance with an embodiment of the invention.

FIG. 4 illustrates a user interface 400 supplying system or security analytics, metrics, reports and statistics. Section 402 provides a system overview that shows relationships between containers, applications and application stacks, which comprise one or more applications. Section 403 shows ranked security events, alerts and incidents. Section 404 profiles different types of applications and application stacks. Section 406 profiles containers.

The container security platform 142 includes a management module 210 that controls the launch, provisioning, management, monitoring, communication, security scanning and policy computation of all modules and services across the entire system. In a typical deployment, there is a large number of containers executed across a cluster of servers. This may be in the form of an on-premises data center deployment, private cloud deployment or a public cloud deployment.

The container security platform 142 is designed to be highly available and autonomous. In one embodiment, an instance of the container security platform 142 and all its modules and containers runs on every server, and all those instances form a cluster. Alternately, as shown in FIG. 1, the container security platform 142 is executed on one server 104 and other servers 150_1 through 150_N run a container security platform instance 162 (e.g., comprising an ingestion module 200 and enforcement module 208). Alternately, the modules and containers that comprise the container security platform may be fully distributed across all machines.

The container security platform 142 uses multiple communication methods to ensure service stability and consistency. In one embodiment, the management module 210 uses the SWIM Gossip protocol to manage cluster membership across modules. This protocol broadcasts messages within a computer cluster (e.g., server 104 and servers 150_1 through 150_N). The protocol is based on the Scalable Weakly-consistent Infection-style Process Group Membership Protocol (SWIM). The Raft consensus protocol may be used to coordinate leader election. In one embodiment, the leader (e.g., server 104) orchestrates all container security platform processes in a cluster. That leader also responds to events, such as the discovery of new applications by launching additional instances of modules. The management module 210 also rebalances processes across servers in a way similar to other process orchestration engines.

The ingestion module 200 ingests all commands and events from the container engine 222, either in an active intercept mode or a passive listening mode, for downstream analysis. The machine learning module 202 creates application behavior models. In one embodiment, there is an Extractor module, a Transformer module and a Learner module. Extractor identifies and gathers useful raw data of operating signals from the system, Transformer formats and processes the data, and Learner continuously builds application behavior models (described in detail below).

Models 204 may be stored in a database that includes models, component data, stateful system data, information exchanges between machines, and raw data or logged data. This raw or logged data may optionally be sent to an external system, such as a security information and event management (SIEM) system for further processing and analysis.

A proxy service running in a container may optionally be used to orchestrate network-related operations. The proxy may incorporate container networking technology. Operations may include setting up multi-node networks, subnets, interfaces, and port mirroring. Monitoring operations include tapping all network traffic for all containers on all nodes in the system, parsing the network traffic by protocol (e.g., HTTP), converting the output into formats optimized for machine learning, and sending the formatted network traffic to the machine learning module 202 through a message broker. If desired, the proxy can operate without affecting the container engine infrastructure or applications by copying network data between application containers and the proxy. Alternatively, the proxy can operate in "man in the middle" mode by actively intercepting network data and dynamically enforcing network policies to mitigate attacks.

The management module 210 may include a message broker. In one embodiment, the message broker is Apache® Kafka®. Apache® Kafka® is an open source message broker project developed by the Apache Software Foundation. The message system is a massively scalable publish/subscribe message queue architected as a distributed transaction log to process streaming data. Apache® Kafka® operates in conjunction with Apache® ZooKeeper®, which is also an Apache Software Foundation open source initiative. Zookeeper® provides a distributed configuration service, synchronization service and naming registry for large distributed systems.

The management module 210 may include a scanning technology that processes data to test all possible input spaces of an application to emulate benign operations, emulate malicious attacks, and test potential vulnerabilities. This allows the machine learning module 202 to generate data on application behavior with normal data and commands, application behavior during an attack, and behavior after (or resulting from) an attack. In a typical deployment, the management module 210 will launch a package of attacks against new applications during the onboarding process. This allows the machine learning module 202 to learn the characteristics of benign and malicious behavior in the user's system. It may also be scheduled by an orchestration engine to run periodically for security testing of new applications, environments, threats, vulnerabilities, or attack methods.

The management module 210 may include an application program interface (API) to collect information for presentation in a graphical user interface (e.g., a web browser 122) or command line interface. For example, the presented information may include system status information and alerts.

The enforcement module 208 prevents, blocks or mitigates malicious activity that is discovered. It consumes alerts and user-defined security policies, quickly determines the best possible solution, and directs enforcement actions. These actions may include issuing a "deny" instruction to the underlying operating system or container engine or sending a command to an external enforcement system.

In a simple scenario, the container security platform 142 is deployed on all servers. Alternatively, to make full use of a micro-services architecture and optimize distribution of resource usage, the container security platform 142 can launch just the minimum number of required components (e.g., ingestion module 200) on most servers, and launch all other components on other servers in the infrastructure. This approach makes the system appear to be a lightweight service to most parts of the infrastructure and avoids slowing down production applications; meanwhile, resource-intensive components run on specified servers, wherever resources are plentiful. Alternately, the container security platform can be fully distributed across all servers by container orchestration technologies to maximize resource efficiency.

The micro-services approach also allows the container security platform 142 to be managed using the user's existing orchestration technology (e.g., Kubernetes, Mesos, Docker Swarm/Orca or Nomad), which would be difficult (if not impossible) with traditional security solutions.

To characterize each container and application stack, the container security platform 142 creates "fingerprints" of all individual containers and applications. The novel fingerprinting process includes three modes of inspection: container, image, and runtime inspection. Container inspection filters available container engine 222 metadata (e.g., "docker inspect <container>") and returns only the subset that is invariant between parallel container execution. The platform 142 determines this subset; it is not a public standard. This may include metadata on mounted volumes, running users, and preconfigured environment variables. Image inspection relies on the "ImageId" output from container inspection, and performs a similar filter on image metadata (e.g., "docker inspect <image>"). Runtime inspection relies on the immutability of containers and initiates the creation of a container identical to the one being analyzed. It uses this identical container to identify default launch states (e.g., what processes are running), authorized users, and all packages installed, by analyzing the output of commands (e.g., "Docker exec <container> (runtime-inspection-command)". This provides a highly unique description of each container and application. In one embodiment, the platform 142 sorts and concatenates the data to create a master description in JavaScript Object Notation (JSON), then creates a SHA-256 hash of this master description, finally yielding the reference stack fingerprint, details of which are provided below. The master description is stored, along with the fingerprint, in the database 204.

The fingerprinting process and the resulting fingerprints uniquely identify distinct application components and configuration, reveal equivalence between identical profiles despite different container names, make it easy to determine differences between containers, provide metadata useful for machine learning, provide metadata useful for detecting corrupt states, provide metadata useful for enforcement actions, and do not modify the containers in any way. The fingerprinting process is done passively at runtime with no impact on application behavior and no additional latency.

Ideally, many individual application fingerprints are combined to describe an entire system to enable detection of complex vulnerabilities that may occur due to a risky combination of containers and applications (e.g., a specific database version running in a linked container), incompatibility of various disparate functions in the system, or system-wide misconfigurations.

The platform 142 uses the fingerprints and observed system behavior patterns to map potential vulnerabilities, threats, and indicators of compromise across the Cyber Kill Chain®. The Cyber Kill Chain® describes a 7-step progression that many attacks follow, and provides a consistent way to organize and report attack information. This information is then stored and indexed to enable the platform 142 to associate containers with known application types; stored to enable Kill Chain emulation against applications in tests; and feed information to the machine learning module 202 for training.

The machine learning module 202 is responsible for learning the characteristics of benign system behavior and malicious system behavior, and creating a set of sophisticated models to distinguish between the two modes of behavior in real time. To learn benign behavior, the machine learning module 202 can operate in a supervised learning mode when the system is known to be operating in a normal manner (e.g., in a Docker testbed or application staging environment without malicious attacks), an unsupervised learning mode when the system is in steady-state operation and no known attacks are underway, or a semi-supervised learning mode. To learn malicious behavior, the machine learning module 202 can operate in a supervised learning mode when the system is known to be under attack (e.g., as part of an application onboarding process or during a user-driven penetration test), in an unsupervised learning mode when the platform 142 observes system behavior patterns that are already known to be malicious (e.g., from prior security research or previous supervised learning), or a semi-supervised learning mode.

The machine learning module 202 separately models each application and shares the models across the user's entire system. These models are updated constantly because benign and malicious behaviors can change frequently in a production environment, as user, container and application behavior changes over time and network topologies evolve. The models are also updated because the number of instances of applications is increased or decreased dynamically based on load, availability, redundancy or other requirements. Models are also updated because attack behaviors can change as attackers update their methods to evade detection, new attack methods are developed and observed, or system configurations are changed so known attacks cause different behaviors.

In one embodiment, models are pre-seeded with known indicators of malicious behavior and related metadata. This enables the platform 142 to map observed behavior to these known indicators, then to their associated attack categories and then to their associated Kill Chain steps.

Figure 5:
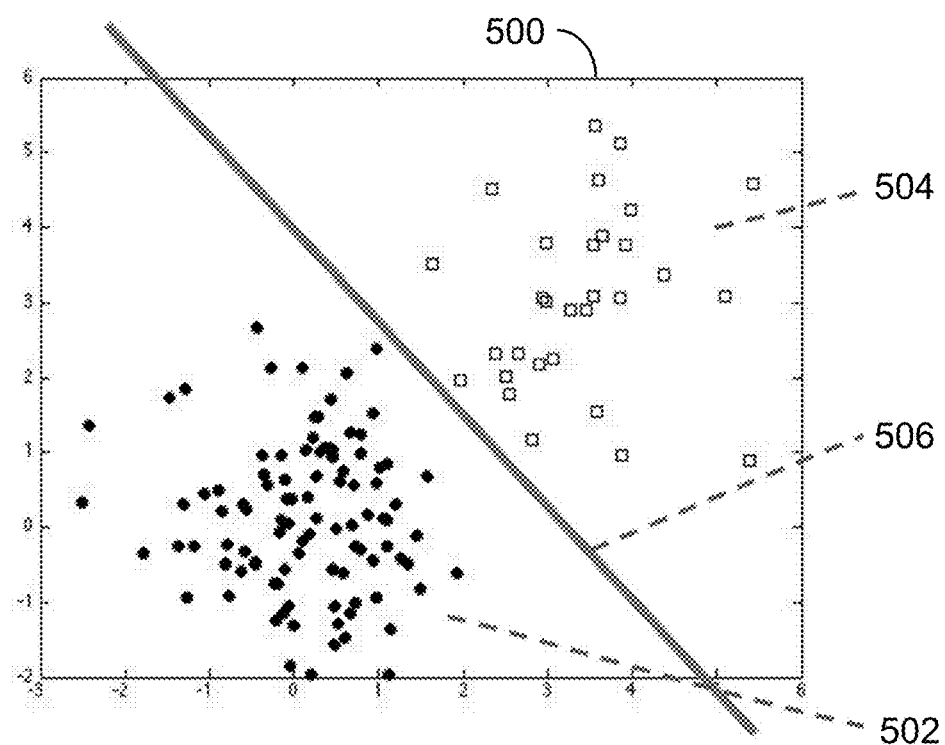
FIG. 5 illustrates discriminative prediction data formed in accordance with an embodiment of the invention.

The machine learning module 202 may utilize a variety of models. One model is a discriminative model. This is a predictive model of the temporal evolution of an application's state, built on observations of an application's interaction with the system and network. In one embodiment, this model uses Vowpal Wabbit to perform logistic regression. Vowpal Wabbit is a fast, out-of-core, machine learning system sponsored by Microsoft® and Yahoo! ®. The logistic regression predicts the next observation the machine learning module 202 is likely to receive given all past observations that the module has processed. This is used to filter out observations that are likely to indicate benign behavior, so the remaining observations can be transmitted to other classification models for detailed analysis. This approach helps preserve detection efficacy even when behavior baselines are changing by subtracting benign signals in real time and enabling the platform 142 to focus on anomalous and malicious signals. FIG. 5 illustrates a scatter plot 500 with negative samples in a first region 502 and positive samples in a second region 504. A decision boundary 506 separates the two regions.

Figure 6:
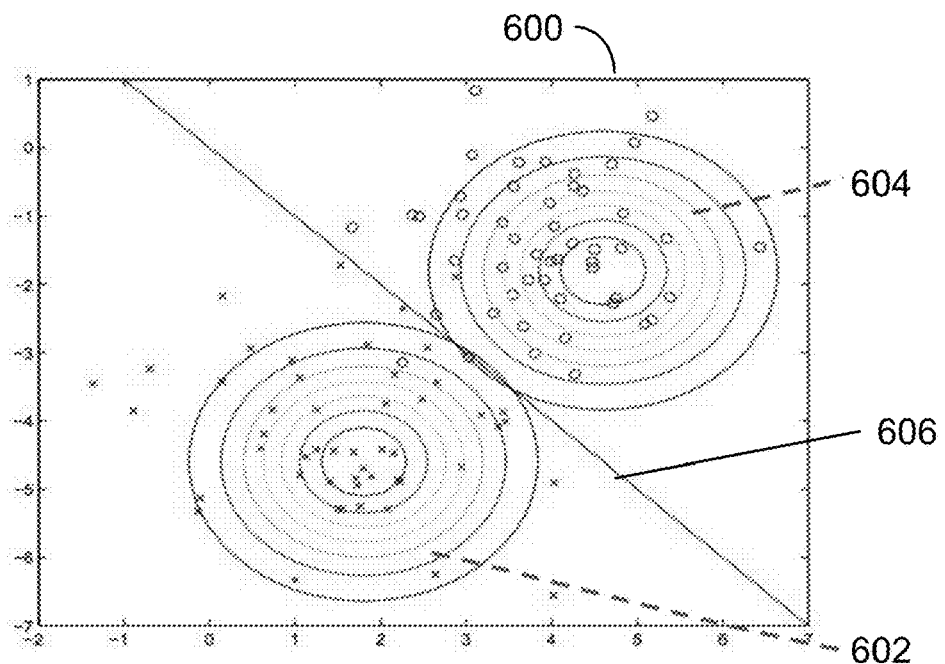
FIG. 6 illustrates generative prediction data formed in accordance with an embodiment of the invention.

Another model is a generative model, which is a predictive model of the distributions of all observations in a given class. The platform 142 implements two instances of this model—one for benign feature vectors and another for malicious feature vectors. This type of Bayesian model, part of the Gaussian Discriminant Analysis class, is used to compute the probability that any given observation is indicative of benign or malicious behavior. Results of this analysis are used to independently validate the results of the discriminative model. FIG. 6 illustrates a contour plot 600 with a first contour 602 of negative samples and a second contour 604 of positive samples. A decision boundary 606 dissects the regions.

A set model checks observations against a list of known benign or known malicious indicators. The platform 142 implements two versions of this type of model. The first references a list of all observations from an application's benign baselining period to identify any new observations that do not match a known benign behavior. The second references a list of static rules representing malicious behavior to identify any new observations of malicious behavior.

Another model is a Kalman Filter. In one embodiment, this is a two-step recursive algorithm. First it produces estimates of the application's current state variables and their uncertainties. Then, after the next observation arrives, the estimates are updated using a weighted average, with more weight given to estimates with higher certainty. This enables the platform 142 to adjust to changing baselines in real time.

Another model is a grammatical model, which operates on sequences of data from an application session (e.g., HTTP metadata) after the data are collected and parameterized by the generative model. The model is the smallest deterministic finite automaton (DFA) with constraints on edges that captures all observed sequences. Any deviation in the expected sequence of data, or any violation of an edge constraint, causes the session to be classified as anomalous and transmitted to other classification models for further analysis.

The machine learning module 202 assigns different weights to the output of each of the models and combines the results to generate a single classification (e.g., benign or malicious corresponding to a particular step in the Kill Chain) and confidence measure (i.e., likelihood of being malicious) and uniqueness measure (i.e., the frequency of occurrence) per alert. An ensemble prediction may include a discriminative prediction, a generative prediction, a rule prediction, a discriminative score and a set prediction combined in a weighted manner.

The machine learning module 202 analyzes a wide range of inputs, including network packets, network traffic data, system state, process data, workload transactions, memory snapshots and malicious indicators in memory, and container engine commands and events. The module selects the most important features from all the data and builds optimized detection models. These models are designed to detect common security problems, such as application vulnerabilities, container weaknesses, network intrusions, credential harvesting and privilege escalation, data loss, abuse of system resources, distributed denial of service (DDoS) and other attacks highlighted by the Open Web Application Security Project (OWASP). It is also designed to detect malware activity, lateral movements, zero-day vulnerabilities, and advanced persistent threats.

The enforcement module 208 may deploy a number of enforcement mechanisms. For example, the platform 142 can detect an attack in progress and reprogram the user's software-defined networking (SDN) controller to mitigate risk. Possible actions include immediately shifting critical services, application data and assets away from vulnerable servers, rerouting sensitive traffic through more secure channels, blocking malicious traffic, or requiring heightened user authentication. The enforcement module 208 may be configured to enforce security policies automatically or after prompting a user through the management module 210. Other enforcement mechanisms include modifying existing application container security policies, killing malicious containers, denying operating system processes, blocking network attacks or sending enforcement commands to external enforcement systems (e.g., via API integration with existing security infrastructure).

The enforcement module 208 may include an integrated authentication and authorization monitoring system that is compatible with existing protocols. The monitoring system monitors workloads, applications and third-party services to detect malicious access. The enforcement module can ensure compliance with predefined authentication policies or create new models of authentication and authorization behavior.

The enforcement module 208 may be operative as a remote execution engine on each server running applications (including micro-services) protected by the container security platform. This enables users to query containers to find indicators of compromise. The platform 142 can ingest and execute instructions in the form of malicious pattern indicators (e.g., YARA rules) to support incident response or forensic investigations. The platform 142 creates policies based on machine learning module 202 behavior analysis, and can enforce these policies (e.g., limiting container privileges and access rights) during runtime to prevent any malicious modifications.

The enforcement module 208 may include policies to control applications and data isolation. Name spaces may be used to provide mechanism for aggregating and partitioning sets of tasks and their child processes into hierarchical groups with specialized behavior. A name space has symbols that are used to organize objects so that the objects may be referred to by name. AppArmor® may be used to enforce isolation. AppArmor® is a Mandatory Access Control system that is a kernel enhancement to confine programs to a limited set of resources. Networking isolation may be enforced using Libnetwork® and Open vSwitch®. Libnetwork® is a multi-platform library for networking containers. Open vSwitch® is a production quality, multilayer virtual switch. It operates under the open source Apache 2.0 license. Representational State Transfer (REST) application programming interfaces may be used to fully integrate with existing infrastructure.

The machine learning module 202 analyzes data set representations of operating signal data using various models. In one embodiment, the following definitions are used to define various metrics associated with any individual model's effectiveness: True Positive (TP)—a malicious vector correctly classified as malicious; False Positive (FP)—a benign vector incorrectly classified as malicious; True Negative (TN)—a benign vector correctly classified as benign; and False Negative (FN)—a malicious vector incorrectly classified as benign. In this context, a fraction of malicious predictions that are actually malicious is a precision measure (TP/(TP+FP)). A fraction of total malicious traffic identified is a recall measure (TP/(TP+FN)). A fraction of benign predictions that are actually benign is a specificity measure (TN/(TN+FP)). A fraction of total benign traffic identified is a negative predictive value (TN/(TN_FN)). A fraction of correct characterizations is an accuracy measure ((TP+TN)/(Total Samples).

Attention is now directed to a specific implementation of the machine learning module 202. The machine learning module 202 is used to detect anomalous or malicious behaviors. The machine learning module 202 may be used during learning to produce models, which are summarizations of observed benign and malicious behavior. For example, the discriminative algorithm computes the values of the parameters that define the separating hyperplane, the generative benign model computes the values of the parameters of the posterior distribution of the data, and the set model maintains the UUIDs of filters and the values that were observed for those UUIDs during benign learning, etc. The efficacy of a model is a measure of its ability to detect known anomalies and known malicious behaviors. This measure is captured by the previously referenced precision, recall, specificity, negative predictive value, and accuracy metrics, referred to as learner metrics.

A data set representation of operating signals is a collection of feature vectors, with each feature vector having a label that indicates whether it is benign or malicious. A dataset that is used to compute learner metrics is referred to as a test set. The system can build a model by initiating a learning cycle on a machine learning algorithm. The provenance of a machine learning model is the source that initiated the learning cycle that built the model. In one embodiment, the machine learning module 202 has a learner module, a feedback engine, and a dynamic retrender.

Models of the machine learning module 202 are stored with provenance. A user is able to choose an existing model from the database for use in detection. The model in memory that is used for detection may have an identical version of it stored in the database (e.g., models 204). The models are searchable by the application they are used to model behavior for, efficacy, creation date, or provenance.

The platform 142 may support an API that can be used to perform various operations on the models. For generative benign and generative malicious models it is useful to specify the mean and standard deviation for any subset of dimensions, the prediction and score for a given feature vector, the probability that a given dimension has a non-zero value in a feature vector, and the values of the hyper-parameters that were used to build the model.

For the set model it is useful to specify the set of filter UUIDs and the values for each UUID that was seen during benign learning, the prediction and score for a given feature vector, and the values of the hyper-parameters that were used to build the model.

For the discriminative model it is useful to specify the parameters of the model that define the decision boundary, the prediction and score for a given feature vector, the distance from the hyperplane for a given feature vector and the values of the hyper-parameters that were used to build the model. For the rules model it is useful to specify the set of static filter UUIDs.

When a user provides manual input to change the category of an alert to either benign or malicious, using either the graphical user interface, the command line interface or an API, the machine learning module 202 stores the alert's underlying feature vector in an in-memory corpus. This corpus serves as a "whitelist" (and in the case of anomalous alerts reclassified as malicious, a "blacklist").

The machine learning module 202 is launched for each known fingerprint. The fingerprint of a container is used to route data from the ingestion module 200 to the appropriate machine learning module. When the same application is used in multiple application stacks, then data for all containers of that application is routed to the same machine learning module, which results in a combination of behavior learned from the applications in different application stacks.

Therefore, additional information about an application is required in order to differentiate a particular application in one application stack from that same application in a different application stack.

Environment variables may be used to differentiate an application that spans multiple application stacks. By including environment variables in the application fingerprint, a unique linkage can be created between a container and the definition of a particular application irrespective of the application stack the application is associated with.

Suppose an application for a particular application stack is defined using an environment variable, and an application fingerprint is generated using the standard fingerprinting fields in addition to the environment variable. When a container of that application is launched using the environment variable with the same value, then an application fingerprint is generated that equals the application fingerprint of the application. Suppose further that the same application is defined for a different application stack with a different value for the environment variable, and the appropriate application fingerprint is generated when containers of that application are launched. Then, two containers exist for the same application with different fingerprints due to the additional information provided by the new environment variable. Thus, behavioral learning is differentiated.

The container security platform 142 supplies measures of confidence in the integrity of applications or containers. The measure of confidence may evaluate multiple factors including but not limited to: (1) whether a container image employs signing using cryptographic keys and whether such keys have been generated by administrators or end users of the platform or a private or public certificate authority; (2) whether the containers have undergone a trusted attestation process using a hardware root of trust such as a Trusted Platform Module (TPM); (3) whether a container image contains vulnerabilities that are surfaced by scanning each layer of the image; (4) metadata attributes of the container including labels, the environment in which is running, or the type of data it is intended to process; (5) runtime behavior determined to be benign, anomalous, or malicious by the platform's machine learning module; and (6) efficacy metrics of the machine learning model (e.g., true positives, false positives, true negatives, false negatives). The platform applies a weighting to each of these factors to generate a measure of confidence regarding the integrity of the application or container. The platform also evaluates occurrences of specific security events associated with these factors to determine a measure of uniqueness that indicates the relative frequency of security events affecting the integrity of an application.

One of the benefits of using containers to run applications in a micro-services architecture is that they can be quickly and dynamically scaled, moved, or updated. However, scaling, moving, or updating applications running in containers may result in changes in deployment and network topology that may result in changes in application behavior. Additionally, an application's operations may change in unexpected ways based on different functions it must perform over time, or the applications that a specific application interacts with as part of its normal operations may also change, which may result in changes in application behavior. These changes in application behavior may impact the ability of the machine learning module 202 to correctly characterize a particular application behavior as benign or malicious in an operational phase. While this could be addressed by switching the operation of the machine learning module 202 from an operational phase to a training phase that utilizes new operating signals based on the new application behavior, this may be interruptive. Therefore, the machine learning module 202 incorporates continuous, adaptive, and dynamic "re-trending" that allows the models to take into consideration intentional (and repetitive) changes in the behavior of one or more applications as well as the overall system during the operational phase, without requiring the machine learning module to switch to a training phase. This dynamic re-trending is achieved through a number of different methods. In one method, the machine learning module 202 evaluates changes in operating signal patterns and assigns a weight to the summarizations of past observations of benign and malicious activity. Summarizations of new observations of benign and malicious activity are used to either quickly or gradually adjust the mean of a multi-variate Gaussian distribution of all observations. In another method, the machine learning module 202 selects a random subset of a historically observed data set representation of operating signals, either benign or malicious, to construct one or more clusters and builds Gaussian distributions associated with each cluster.

Those skilled in the art will appreciate that the container security platform 142 provides security services that are divided, using a micro-services approach, into a set of interconnected containers woven among the main applications and software infrastructure to be protected. In this way, it embeds advanced security services into a user's software infrastructure as a protective layer between the hardware and the applications. The platform 142 is designed to run in any centralized, decentralized or distributed network. The architecture flexibly enables easy integration with a wide range of server systems, agnostic to a user's choice of computer hardware infrastructure. It is also designed to secure any containerized application, agnostic to the application's function or architecture.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
 a processor; and
 a memory connected to the processor, the memory storing instructions executed by the processor to:
  collect operating signals from machines, wherein each operating signal characterizes the state or a change in operational state of a designated application operating within a designated container, wherein the designated container is an isolated process in user space designated by an operating system kernel, wherein the operational state includes characterization of system calls, function calls, network input and output, file reads and file writes for the designated application,
  compare the operating signals to models that incorporate summarizations of data sets that represent observed benign operating signals and malicious operating signals for the designated application operating within the designated container, and
  characterize risks associated with the operating signals.

2. The server of claim 1 wherein each operating signal includes container event and command signals for the designated container.

3. The server of claim 1 further comprising instructions executed by the processor to form a fingerprint for the designated container based upon behavior of the designated container.

4. The server of claim 3 wherein the behavior includes runtime attributes of the designated container.

5. The server of claim 3 further comprising instructions executed by the processor to combine behaviors from multiple containers to produce an application fingerprint.

6. The server of claim 5 further comprising instructions executed by the processor to combine behaviors from multiple application fingerprints to characterize a system.

7. The server of claim 1 further comprising instructions executed by the processor to form a fingerprint for the designated container based upon static attributes of the designated container.

8. The server of claim 1 wherein the models include a discriminative model that classifies operating signals into either benign operating signals or malicious operating signals for the designated application.

9. The server of claim 1 wherein the models include a generative model that is a predictive model of next application state given a sequence of past application states for the designated application.

10. The server of claim 1 wherein the models include a generative model that is a predictive model of all observations in at least one benign category for the designated application.

11. The server of claim 1 wherein the models include a generative model that is a predictive model of all observations in at least one malicious category for the designated application.

12. The server of claim 1 wherein the models include a generative model that is a predictive model of all observations in multiple categories for the designated application.

13. The server of claim 1 wherein the models include a set model for a benign category including a list of benign indicators.

14. The server of claim 1 wherein the models include a set model for a malicious category including a list of malicious indicators.

15. The server of claim 1 wherein outputs from the comparison of the operating signals to the models are assigned different weights and are combined to generate a single classification.

16. The server of claim 15 wherein the single classification has an associated confidence measure.

17. The server of claim 15 wherein the single classification has an associated uniqueness measure.

18. The server of claim 1 further comprising instructions executed by the processor to enforce a security measure in response to operating signals that exceed a risk threshold.

19. The server of claim 1 further comprising instructions executed by the processor to supply security analytics.

20. The server of claim 1 further comprising instructions executed by the processor to supply a measure of machine learning model efficacy.

21. The server of claim 1 further comprising instructions executed by the processor to prepare a report that combines the risks associated with the operating signals with information technology system characteristics for the designated application.

22. The server of claim 1 further comprising instructions executed by the processor to supply a measure of confidence in the integrity of the designated application.

23. The server of claim 1 further comprising instructions executed by the processor to supply a measure of confidence in the integrity of the designated container.

24. The server of claim 1 wherein the instructions executed by the processor to collect, compare and characterize are implemented in a security platform container.

25. The server of claim 24 further comprising instructions executed by the processor supply a measure of confidence in the integrity of the security platform container.

26. The server of claim 1 further comprising instructions executed by the processor to analyze anomalous operating signals to characterize the likelihood of an application transition from a benign state to a malicious state.

27. The server of claim 1 wherein the models adapt to changes in benign or malicious application behavior during an operational phase.

28. The server of claim 1 further comprising instructions executed by the processor to analyze relationships between operating signals, security events, or security policies.

29. The server of claim 1 further comprising instructions executed by the processor to analyze operating signals, security events, or security policies to recommend security policies or security measures.

* * * * *